United States Patent [19]

Frei

[11] Patent Number: 4,723,214

[45] Date of Patent: Feb. 2, 1988

[54] AUTOMATIC CAMBER CONTROL

[75] Inventor: Douglas R. Frei, Stony Brook, N.Y.

[73] Assignee: Grumman Aerospace Corporation, Bethpage, N.Y.

[21] Appl. No.: 702,170

[22] Filed: Feb. 15, 1985

[51] Int. Cl.[4] .................... G06F 15/50; B64C 13/00
[52] U.S. Cl. .................................. 364/434; 364/435; 244/76 R; 244/181
[58] Field of Search ............... 244/76 R, 177, 178, 244/181; 364/434, 435; 73/178 R; 318/584

[56] References Cited

U.S. PATENT DOCUMENTS

| | | | |
|---|---|---|---|
| 2,943,823 | 7/1960 | Mullins, Jr. et al. | 244/178 |
| 3,215,374 | 11/1965 | Olshausen | 244/191 |
| 3,240,447 | 3/1966 | Olshausen | 244/177 |
| 3,399,849 | 9/1968 | Hendrick | 244/187 |
| 3,691,356 | 9/1972 | Miller | 244/181 |
| 3,734,432 | 5/1973 | Low | 244/178 |
| 4,261,537 | 4/1981 | Tisdale, Sr. et al. | 364/434 |
| 4,371,936 | 2/1983 | Adams et al. | 364/434 |
| 4,382,282 | 5/1983 | Graham et al. | 364/434 |
| 4,562,546 | 12/1985 | Wykes et al. | 364/434 |
| 4,569,493 | 2/1986 | Burhans, Jr. | 244/76 R |

OTHER PUBLICATIONS

Kohn, "Application of Lagrange Optimization to the Drag Polar Utilizing Experimental Data", AIAA Aircraft Systems and Technology Meeting, Aug. 20-22, 1979, New York.
Spacht, "The Forward Swept Wing: A Unique Design Challenge," AIAA Aircraft Systems Meeting, Aug. 4-6, 1980, Anaheim, Calif.
Moore, et al., "X-29 Forward Swept Wing Aerodynamic Overview," AIAA Applied Aerodynamics Conference, Jul. 13-15, 1983, Danvers, Mass.

*Primary Examiner*—Gary Chin
*Attorney, Agent, or Firm*—Pollock, VandeSande & Priddy

[57] ABSTRACT

Wind tunnel data for a three control surface aircraft is developed for lift, pitching moment, and drag coefficient characteristics. This data is then input into a Lagrange optimization program to determine a unique combination of canard, flap, and strake flap position that trimmed the pitching moment coefficient to zero and provided the minimum drag coefficient as a function of lift coefficient and/or angle of attack, Mach number, and altitude. This program is exercised over the entire Mach number, altitude, and angle of attack range of the aircraft. The output from the Lagrange optimization program are then tabulated and loaded into the memory of a digital flight control computer of an aircraft. As the aircraft flies, the angle of attack sensor, air data sensor and altimeter determine the angle of attack, Mach number and altitude of the aircraft. By means of the computer, the position of the control surfaces are changed to the predetermined settings of the look-up table for minimum drag.

7 Claims, 8 Drawing Figures

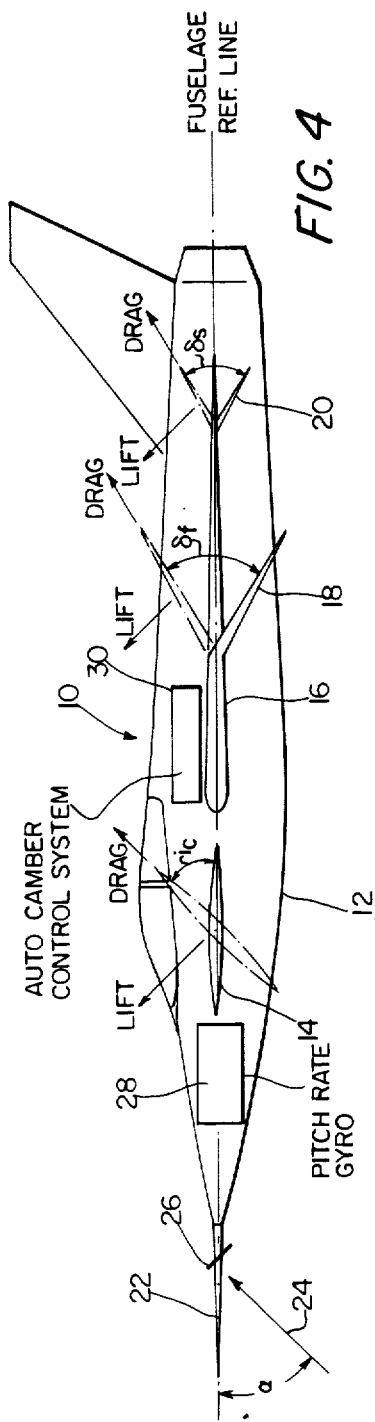
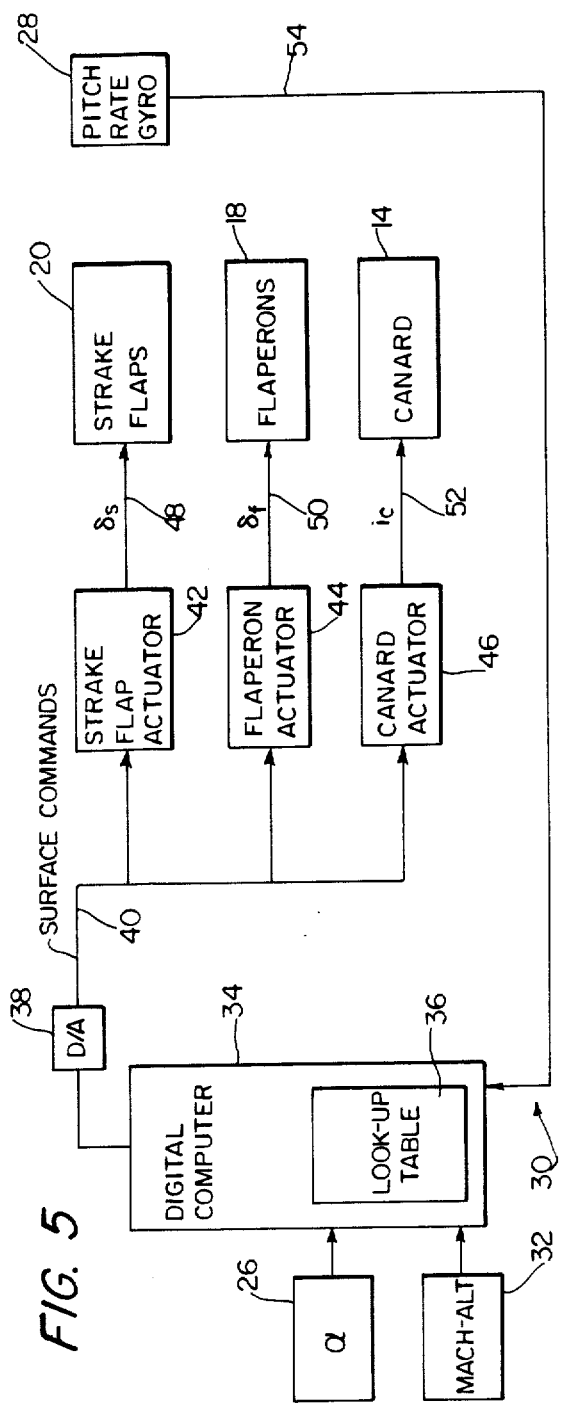

AUTOMATIC CAMBER CONTROL

FIELD OF THE INVENTION

The present invention relates to aircraft control systems and more particularly to a control system for automatically achieving minimum drag while trimming the pitching moment of an aircraft to zero.

BACKGROUND OF THE INVENTION

Many advanced aircraft configurations of current interest feature multiple control surfaces that need to be carefully scheduled for optimum performance. By way of example, for a candid controlled fighter configuration, the task may be to schedule canard and wing leading edge and trailing edge flaps for minimum trimmed drag at a cruise condition. When the surfaces to be scheduled are few, the determination of the optimum setting of the surface is simple. However, often there are many surfaces to be considered which compounds the problem. During aircraft configuration development decisions must be made as to the control surface deflections to be tested and built into the configurations. The task of determining the optimum setting is therefore complex and time consuming. There is also the need for some synthesis in terms of the control deflections of the performance effect of so many variables.

An optimization technique for assisting in the problems mentioned above encountered during aircraft design was published in a paper given at an AIAA Aircraft Systems and Technology Meeting, Aug. 20–22, 1979, and entitled "Application of Lagrange Optimization to the Drag Polar Utilizing Experimental Data" by J. S. Kohn, an employee of the present assignee. The paper is numbered 79-1833.

The Lagrange optimization used with linear aerodynamic theory to define optimum aircraft geometry is shown to have application to the determination of optimum control surface deflections as a function of angle of attack necessary to provide a maximum lift-drag deflection for a multiplane aircraft configuration. This optimization technique is suggested as a research tool in designing an aircraft configuration so that an optimized performance characteristic, such as minimum trimmed drag, may be accomplished at a particular condition, such as a cruise condition.

BRIEF DESCRIPTION OF THE PRESENT INVENTION

The present invention is an extension of the discussed prior art Lagrange optimization for a control system of a multiplane aircraft which enables automatic camber control. More specifically, the present invention is incorporated into an aircraft flight control computer so that optimum performance can be achieved during an entire range of actual flight conditions.

The present invention constitutes an automatic camber control to position three control surfaces of an aircraft for optimum aerodynamic effeciency throughout the flight envelope. The three control surfaces include forwardly positioned canard, intermediately positioned flaperons and rearwardly located strake flaps. By way of example the present control system is utilized to deflect the flaperons to increase the wing camber during transonic maneuvering to reduce drag and improve performance. In addition during supersonic cruise, the control system is used to deflect the trailing edges of the flaperons to reduce camber and optimize performance.

Thus, the automatic camber control concept of the present invention is employed to vary the wing camber and to position the canard and strake flaps for optimum performance throughout the flight envelope.

The present automatic camber control system was designed to trim the multiplane aircraft X-29 although the concept is equally applicable to other multiplane configurations utilizing a number of control surfaces. By virtue of the present invention, the three control surfaces are controlled in an interrelated manner to allow the aircraft to operate on an optimum polar.

The optimum three surface control positions are scheduled as a function of Mach number and altitude and are programmed into a flight control computer. The optimum three surface control schedule is developed by using a linear Lagrange Optimization Program that analyzes an aerodynamic sensitivity matrix to produce the optimum angle of attach, canard incidence, flaperon deflection and strake flap detection to trim the pitching moment at a given lift coefficient and nominal center of gravity. The look-up table schedule in the flight control computer is programmed in the form of canard incidence as a function of angle of attack and strake flap deflection as a function of flaperon deflection at several Mach number and altitude conditions. The flight control computer trims the aircraft based on angle of attack, setting the proper canard incidence, then moving the flaperons and strake flaps in relation to each other to trim the residual pitching moment generated by the canard and angle of attack.

BRIEF DESCRIPTION OF THE FIGURES

The above-mentioned objects and advantages of the present invention will be more clearly understood when considered in conjunction with the accompanying drawings, in which:

FIG. 4 illustrates the control surfaces in a multiplane aircraft configuration.

FIG. 5 is a schematic view of the automatic camber control system.

DETAILED DESCRIPTION OF THE INVENTION

In order to establish a control surface position matrix for a look-up table as previously described, wind tunnel tests of the aircraft are conducted. At first the flaperon and strake flap positions are fixed while the canard position is varied at each Mach number over a range anticipated for aircraft operation. Next, the canard and strake flap positions are fixed while the flaperon position is varied over the range of Mach numbers. Finally, the canard and flaperon positions are fixed while the strake flap position is varied over the Mach number range.

Wind tunnel data on lift, pitching moment and drag coefficient characteristics are obtained for each of the control combinations just discussed. This data is then input into a known Lagrange Optimization Program, as previously referenced, to determine a unique combination of canard, flaperon and strake flap positions that trim the pitching moment coefficient of an aircraft to zero while providing the minimum drag coefficient as a function of lift coefficient and/or angle of attack, Mach number and altitude. A primary differentiation of the present invention over the prior art is that the prior art utilized the Lagrange Optimization Program to optimize a single fixed set of design criteria found useful in the design of the aircraft configuration. However, the present invention utilizes a series of Lagrange optimization calculations to form a control surface position matrix so that a resulting look-up table can be formulated enabling exercise of the look-up table over the entire Mach number, altitude, and angle of attack range of the aircraft. In other words the present invention improves upon the prior art by utilizing the Lagrange optimization calculations to vary three control surfaces with respect to one another during continually changing flight conditions for an aircraft. The output from the series of Lagrange optimization calculations may then be plotted in the form shown in FIGS. 1A, 1B, 1C and 1D. The coefficient of lift $C_L$ is conventionally defined by the weight divided by the product of free stream dynamic pressure and wing area. The angular quantities existing along the abscissas of the plots FIGS. 1A–1D are pictorally illustrated in FIG. 4.

Figure 1:
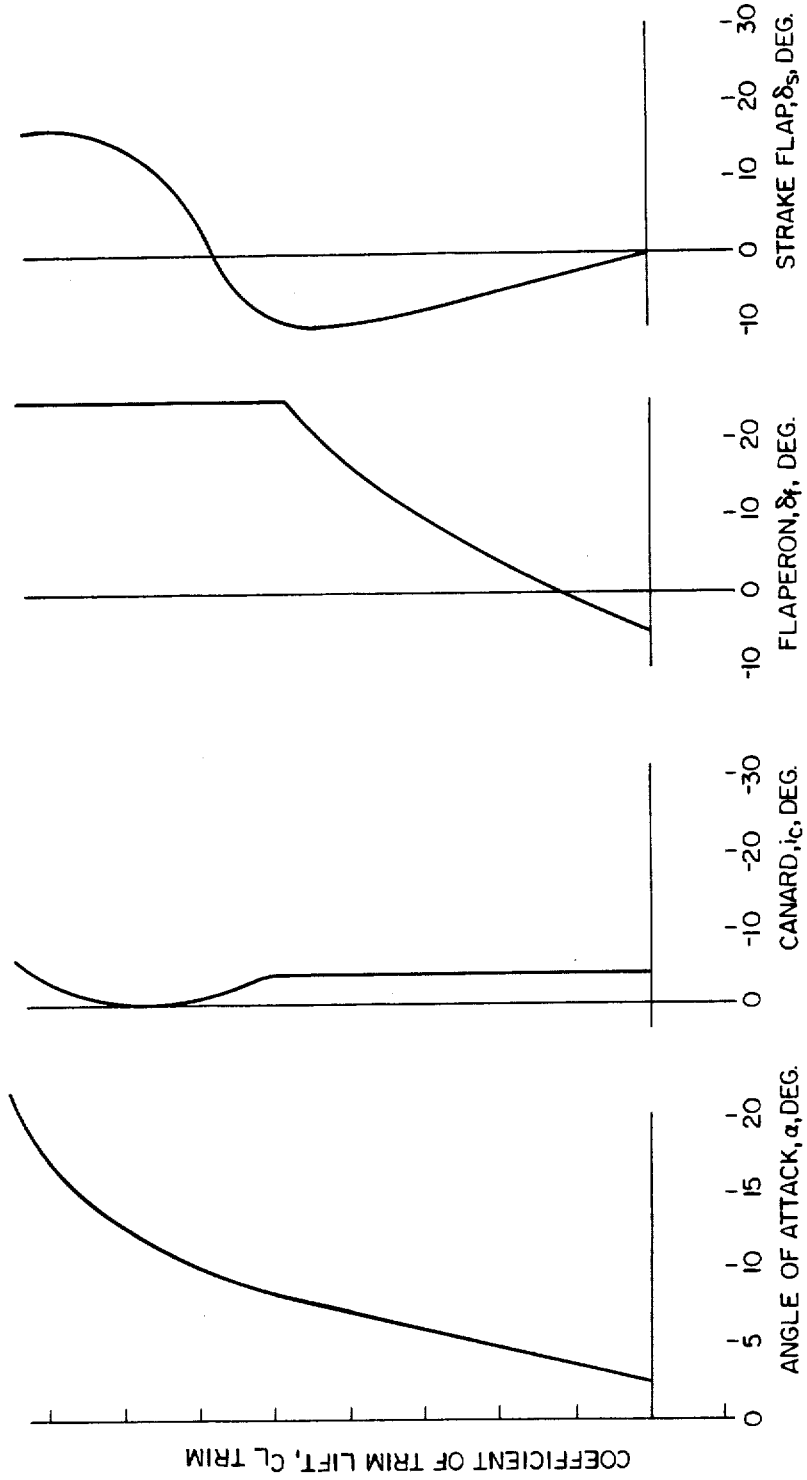
FIGS. 1A–1D are plots of trimmed control surface positions and angle of attack for a constant Mach number and altitude versus coefficient of lift.
Figure 2:
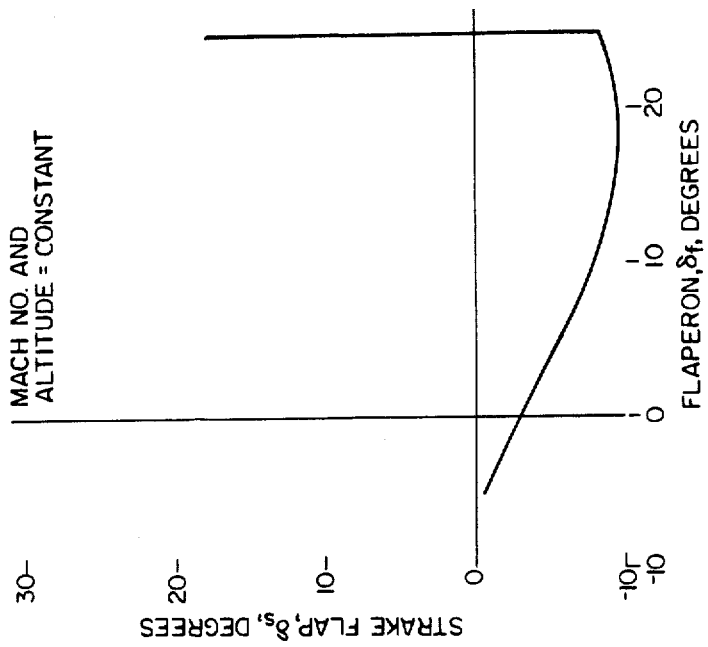
FIG. 2 is a plot of trimmed canard versus angle of attack.
Figure 3:
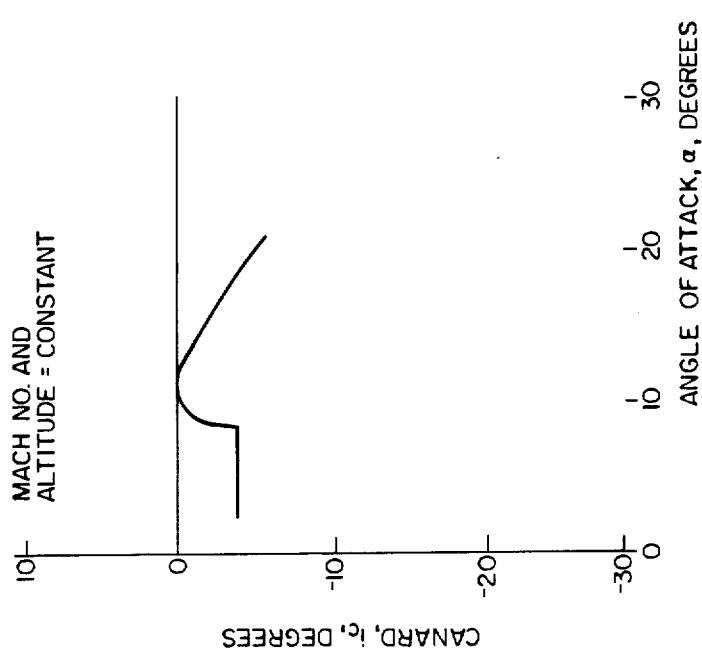
FIG. 3 is a plot of trimmed strake flap versus flaperon deflections.

A second step in the optimization program is to crossplot the data from FIGS. 1A–1D as canard position versus angle of attack and flaperon position versus strake flap position at a constant lift coefficient for the desired Mach number and altitude envelope as shown in FIGS. 2 and 3, respectively. These figures are then tabulated and loaded into a look-up table in memory of the digital flight control computer of an aircraft.

FIG. 4 illustrates the control surfaces in a multiplane aircraft configuration to which the present invention applies. An aircraft is generally indicated by reference 10 and the fuselage 12 of the aircraft mounts a canard 14 which is capable of undergoing variable deflection over the angular range $i_c$. The aircraft wing 16 includes a flaperon 18 capable of undergoing deflection over the angular range $\delta_f$. Finally, in the three control surface example discussed herein, a strake flap 20 is illustrated as having a deflection range $\delta_s$. The forward portion of the aircraft fuselage appends to a nose boom 22 which is colinear with the fuselage reference line or axis. The angle of attack $\alpha$ is defined between a given wind vector 24 and the fuselage reference line. The aircraft illustrated in FIG. 4 is also equipped with a conventional angle of attack vane sensor 26 which is conventionally mounted to the boom 22 for providing angle of attack ($\alpha$) to the automatic camber control system 30 which will be discussed in greater detail in connection with FIG. 5. A conventional pitch rate gyro 28 is also connected to the automatic camber control system 30 to provide information to the system as to whether the aircraft is trimmed.

In order to better understand the structure and operation of the present invention, reference is now made to FIGS. 4 and 5, the latter figure representing a block diagram of the automatic camber control system 30 which processes angle of attack, Mach number and altitude information so that the control surfaces 14, 18 and 20 can be adjusted to achieve minimum drag while the aircraft is trimmed to a zero pitching moment.

As the aircraft 10 flies, the angle of attack sensor 26 generates instantaneous information relative to $\alpha$. FIG. 5 also indicates sensors for Mach number altitude and pitch rate. These would conventionally include a pitot static system, gyro and altimeter. The data from sensors 26 and 32 are provided to the input of a digital computer 34 where look-up tables, including the data of FIGS. 2 and 3 are stored, these data determining unqiue combination of canard, flaperon, and strake flap positions that have been determined by use of the Lagrange Optimization Program to trim the pitching moment to zero. Digital commands generated by computer 34 undergo conversion through a digital-analog converter 38 so that surface commands can be transmitted along wire 40 to the strake flap actuator 42, flaperon actuator 44, and canard actuator 46. The output from these will respectively be sufficient control signals to generate the necessary angular deflections for the control surfaces, namely, $\delta_s$, $\delta_f$, and $i_c$. The corresponding strake flaps 20, flaperons 18 and canard 14 are thereby adjusted to the zero trim condition. Pitch rate gyro 28 is sensitive to deviations from the trim condition during flight. A change from the trim condition causes the pitch rate gyro 28 to signal the digital computer 36 to initiate a new adjustment cycle for achieving a new optimum position. This is typically accomplished 40 times a second and therefore becomes a continual process during the entire flight of the aircraft.

It should be emphasized that, although the present invention is discussed in connection with an aircraft configuration having three control surfaces 14, 18 and 20, the invention is equally applicable to a generalized aircraft configuration having two or more control surfaces.

It should be understood that the invention is not limited to the exact details of construction shown and described herein for obvious modifications will occur to persons skilled in the art.

I claim:

1. In a mulitiplane aircraft having a plurality of control surfaces and provided with means for sensing angle of attack, Mach number, altitude and pitch rate, an automatic camber control system comprising:

a computer having storing means for storing a look-up table containing pre-established angular position data for each of the control surfaces which achieve mimimum drag and zero pitching moment for corresponding sensed angle of attack, Mach number and altitude;

actuating means connected between the computer and each of the control surfaces for deflecting each control surface to the pre-established angular positions after a non-zero pitching moment is found to exist for the aircraft; and means connecting the pitch rate sensing means to the computer for initiating a new cycle of control surface operation each time the pitch rate sensing means signifies the occurrence of a non-zero pitching moment on the aircraft.

2. The system set forth in claim 1 wherein the control surfaces comprise:

fore positioned canard, intermediately positioned flaperons, and aft positioned strake flaps.

3. The system set forth in claim 2 wherein the actuating means comprise individual means for adjusting the angular position of the canard, flaperons and strake flaps.

4. A method for continually updating the angular orientations of multiple control surfaces of an aircraft encountering changing flight conditions, the method comprising the steps of:

storing a look-up table containing pre-established angular position data for each of the control surfaces which achieves minimum drag and zero pitching moment for corresponding sensed angle of attack, Mach number and altitude;

deflecting each of the control surfaces to the pre-established angular positions after a non-zero pitching moment is found to exist at a determined Mach number, angle of attack, and altitude for the aircraft; and initiating a new cycle of control surface operation each time a non-zero pitching moment exists for the aircraft.

5. The method set forth in claim 4 wherein the control surfaces comprise:
fore positioned canard, intermediately positioned flaperons, and aft positioned strake flaps.

6. The method set forth in claim 4 wherein the look-up table results from a number of steps comprising:
tabulating wind tunnel data at various Mach number conditions wherein each control surface is varied as the remaining surfaces are held fixed;
the tabulation of data including lift, pitching moment and drag coefficients characteristics for each condition;
performing a Lagrange optimization for the tabulation of data for determining a unique combination of positions for the control surfaces that trim the pitching moment coefficient to zero and provide the mimimum drag coefficient as a function of lift coefficient and angle of attack, Mach number, and altitude;
performing the optimization over the entire Mach number, altitude and angle of attack range of the aircraft;
developing correlations from the optimization of angular position of a first control surface as a function of angle of attack and angular position relations of the remaining control surfaces at a constant lift coefficient for a desired Mach number and altitude envelope; and
loading the correlations into a memory.

7. A method for continually updating the angular orientations of multiple control surfaces of an aircraft including canard, flaperons, and strake flap while the aircraft encounters changing flight conditions, the method comprising the steps of:
storing a look-up table containing pre-established angular position data for each of the control surfaces which achieves minimum drag and zero pitching moment for corresponding sensed angle of attack, Mach number and altitude;
deflecting each of the control surfaces to the pre-established angular positions after a non-zero pitching moment is found to exist at a determined Mach number, angle of attack, and altitude for the aircraft;
initiating a new cycle of control surface operation each time a non-zero pitching moment exists for the aircraft;
the look-up table resulting from a number of steps including
tabulating wind tunnel data at various Mach number conditions wherein each control surface is varied as the remaining surfaces are held fixed;
the tabulation of data including lift, pitching moment and drag coefficient characteristics for each condition;
performing a Lagrange optimization for the derived tabulation of data for determining a unique combination of positions for the control surfaces that trim the pitching moment coefficient to zero and provide the minimum drag coefficient as a function of lift coefficient and angle of attack, Mach number, and altitude;
performing the optimization over the entire Mach number, altitude and angle of attack range of the aircraft;
developing correlations from the optimization of angular position of the canard versus angle of attack as well as flaperon position versus strake flap position at a constant lift coefficient for a desired Mach number and altitude envelope; and
loading the correlations into a memory.

* * * * *

UNITED STATES PATENT AND TRADEMARK OFFICE
CERTIFICATE OF CORRECTION

PATENT NO. : 4,723,214
DATED : February 2, 1988
INVENTOR(S) : Douglas R. Frei

It is certified that error appears in the above-identified patent and that said Letters Patent is hereby corrected as shown below:

In the Abstract, line 12, change "output" to --outputs--.

Column 1, line 15, change "candid" to --canard--.

Column 1, line 59, change "effeciency" to --efficiency--.

Column 2, line 18, change "attach" to --attack--.

Column 4, line 4, change "unqiue" to --unique--.

Column 4, line 44, change "mimimum" to --minimum--.

Signed and Sealed this

Twenty-eighth Day of June, 1988

Attest:

DONALD J. QUIGG

Attesting Officer

Commissioner of Patents and Trademarks